May 14, 1929.  G. E. BARNHART  1,713,069
MERCHANDISE CARRIER FOR AIRCRAFT
Filed June 7, 1926   2 Sheets-Sheet 1

INVENTOR
George E. Barnhart
ATTORNEY

May 14, 1929.  G. E. BARNHART  1,713,069
MERCHANDISE CARRIER FOR AIRCRAFT
Filed June 7, 1926  2 Sheets-Sheet 2
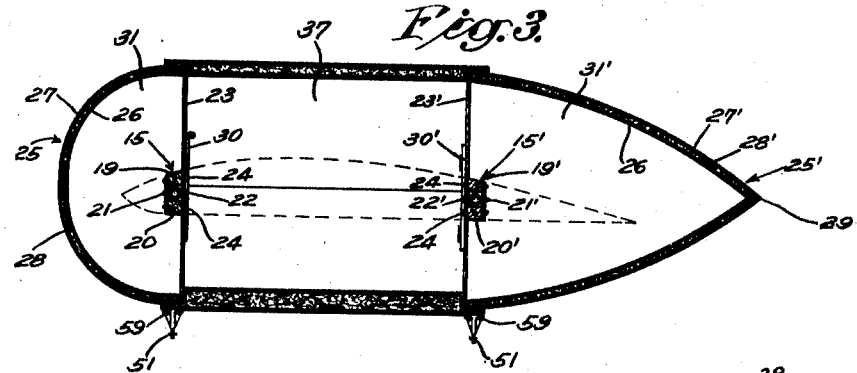
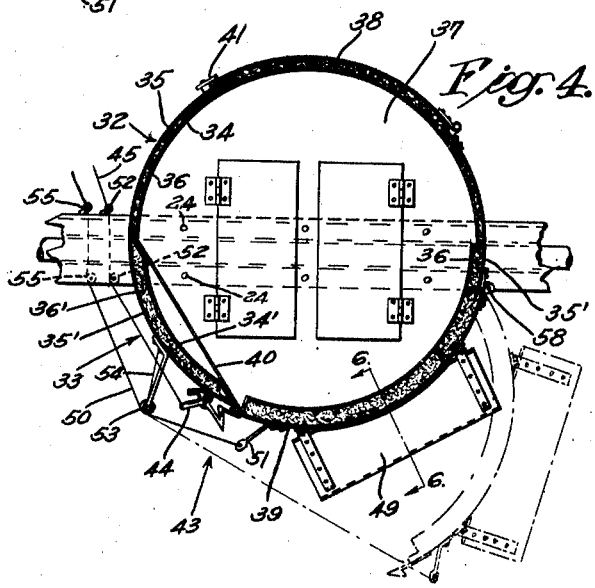
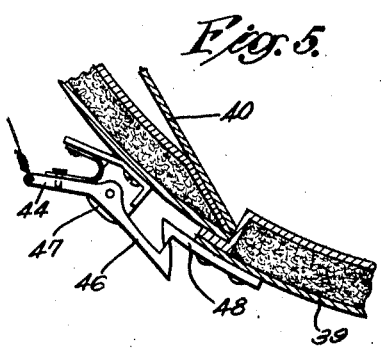
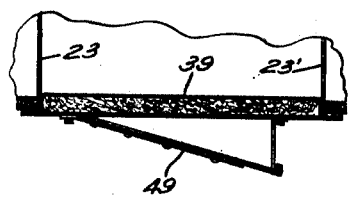
INVENTOR
George E. Barnhart
By
ATTORNEY Patented May 14, 1929.

1,713,069

UNITED STATES PATENT OFFICE.

GEORGE E. BARNHART, OF PASADENA, CALIFORNIA.

MERCHANDISE CARRIER FOR AIRCRAFT.

Application filed June 7, 1926. Serial No. 114,184.

Although this invention is entitled as relating to merchandise containers, it should be understood not only that the mentioned containers are suitable for use in carrying mail (or, in time of war, bombs, and/or a great variety of articles or substances) but that my invention includes also certain combination features, involved in the building-in or supporting of said containers relatively to an airplane.

It is an object of my invention to provide aircraft with stream-line containers which are light, rugged and fire-proof,—these containers being preferably built-in in a manner hereinafter described, or in an equivalent manner, so as to support the same from wing frames.

It is an object of my invention to provide aircraft with containers disposed in pairs within, or partially within the outer surface of the aircraft, but without, or partially without a slip-stream; and, in preferred embodiments of my invention, said containers may be supported independently of the fuselage, as by attaching the same to wires, struts, braces or lifting surfaces,—direct attachment to wing frame elements extending therethrough being deemed especially advantageous.

It is a further object of my invention to provide means adapting an aircraft container to be filled through a top opening and partially or completely emptied through a bottom opening,—a door for this bottom opening being preferably provided with means for its remote control.

It is a further object of my invention to provide suitable means for opening and closing a door provided in the lower surface of a container of the general character referred to.

It is a further object of this invention to provide means for supporting a pair of containers, on opposite sides of the fuselage of an airplane (such as an airplane having a front propeller and an engine section which is removable as a unit) said containers being supported in balanced relationship from oppositely extending stub frames, and said stub frames being held in their intended relationship by means comprising a metallic tubular structural element extending through said fuselage and said containers.

It is an object of my invention to provide biplanes with containers supported below the center of gravity thereof (loaded) but as directly above a pair of landing wheels as it is practicable to dispose the same, with due regard to the clearing of a slip stream and/or a withstanding of shocks produced incidentally to landing.

It is an object of my invention to provide an organization of the general character described which comprises containers that may be loaded either through the top or the bottom thereof and that are provided with means permitting the same to be unloaded while the airplane remains in the air,—said container being optionally subdivided by partitioning elements in such manner as to provide reserve compartments in ends which are rounded or tapered for a stream line effect.

It is a further object of my invention to provide a container, of the general character described, with means (either manually controllable or automatic) for the closing of an opening after material or commodities are delivered therethrough.

It is a further object of my invention to provide a container, of the general character described, with an opening of sufficient length to permit the dropping of a pre-loaded container, optionally provided with a parachute to check its fall, therethrough,— the interior of said container being optionally provided with an inclined wall or skid plate, to prevent unintended lodgement of goods within said container.

It is a further object of my invention to provide an airplane with one or more pairs of containers placed upon supporting wings and so disposed that any container can be loaded or unloaded without disturbing any other container.

It is an object of my invention to provide an armored and/or insulated container provided with a central compartment, from which goods can be freely dropped, and with one or more additional compartments, from which goods preferably cannot be so dropped,—the last mentioned compartment or compartments being accessible through an opening or openings in a plate or plates at an end or ends of said first mentioned compartment.

Other objects of my invention, including certain optional details of latch construction and door-closing means, may be best appreciated from the following description of an illustrative embodiment of my invention, taken in connection with the appended claims and the accompanying drawings, in which Fig. 1 is a front elevational view, with parts broken away.

Fig. 3 is a longitudinal section through a single container, upon an enlarged scale, this view being taken substantially as indicated by the line 3—3 of Fig. 1.

Fig. 4 is a detail view, taken on a scale further enlarged.

Fig. 5 is a detail view showing one suitable form of latch, for use in holding a bottom door closed,—notwithstanding the downward pressure of contained goods thereon.

Fig. 6 is a detail view, taken in a plane such as that indicated by the line 6—6 of Fig. 4.

Referring to the details of that embodiment of my invention chosen for purposes of illustration, 11 may be the fuselage of an airplane of any usual or preferred type, such as an airplane comprising a separately removable engine section 12 to drive a front propeller 13,—the illustrated aircraft being a biplane including stub wings 14, 14',—which may form, with reference to a horizontal plane, a small dihedral angle, such as an angle of 1.5°.

Figure 1:
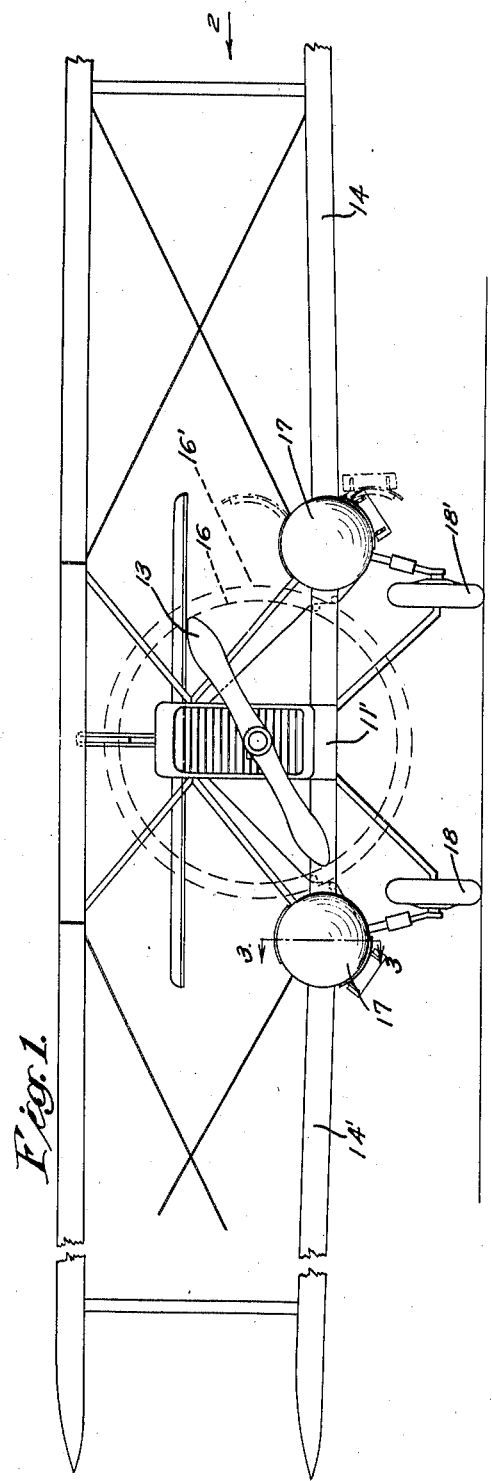
Figure 2:
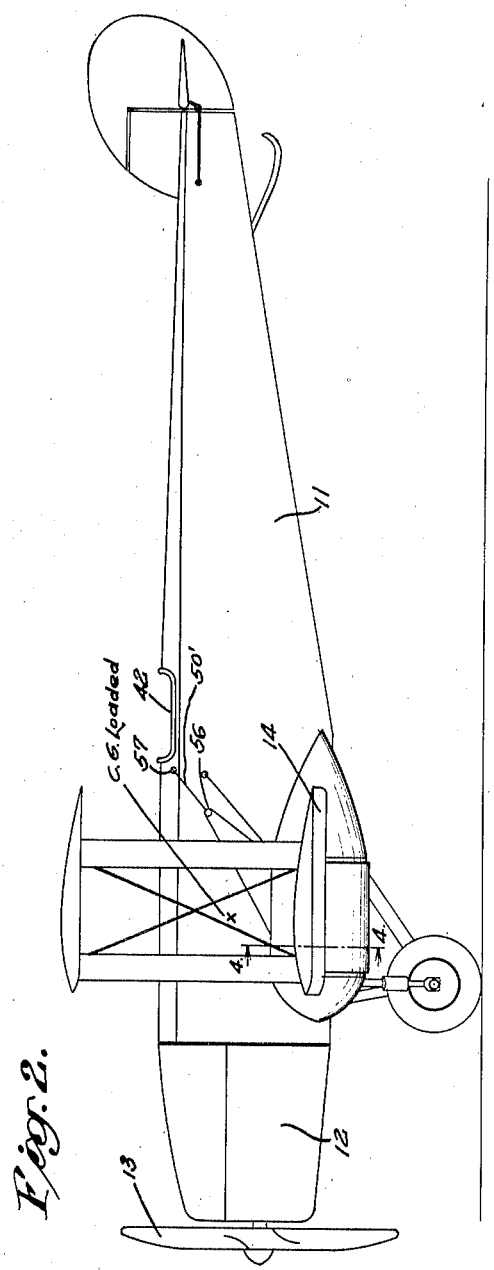
Fig. 2 is a side elevational view, taken from the direction of the arrow 2 of Fig. 1.

Referring now to the novel features upon which protection is herein sought, each of the mentioned stub wings 14, 14', assuming the same to comprise major frame elements 15, 15', extending longitudinally thereof, and assuming the propeller 13 to produce a slip stream whose outline may be diagrammatically indicated, with regard to its expansion in a rearward direction, by the dotted lines 16, 16', Fig. 1, the mentioned wings, or their equivalents, may each carry a container 17,—preferably disposed partly or wholly outside of said stream and in the same vertical plane with the center of gravity of the entire organization (which may, in the case of a biplane, be located somewhat as indicated by the legend "C. G. Loaded" Fig. 2) but above or almost above, and slightly to the rear of, a pair of landing wheels 18, 18'.

The manner in which the last mentioned wheels are secured to the fuselage and/or to the respective stub wings being immaterial to my present invention, I call attention to the fact that the wing frame elements 15, 15' are preferably composite in structure, and may respectively comprise upper wooden strips 19, 19', and lower wooden strips 20, 20', each pair of strips being held together by means such as a metallic or other plate 21, 21',—reinforcing tubular elements 22, 22' being preferably carried not only into the wings 14, 14' but through the respective containers 17 and through the lower portion of the fuselage 11' (Fig. 1) therebetween; and the respective containers 17 may each comprise a pair of end or partitioning plates 23, 23' shown as disposed parallel with the mentioned plates 21, 21', and secured to the main frame elements 15, 15' (whether or not these are built up in the described manner) in any suitable way, as by means of screws 24, extending into the strips 19, 19' and/or 20, 20'.

For a stream-lining effect, I may secure to the respective plates 23, 23' rounded and/or pointed concave members of the general character best shown in Fig. 3,—a forward concave member 25 being shown as comprising an inner wall 26 and an outer wall or armor 27 (spacing and/or insulating means, such as an asbestos web 28, being interposed therebetween) and a rear concave member 25' being shown as comprising an inner wall 26', an outer wall 27' and an insulating and/or spacing member 28',—this rear concave member being, for well known reasons, provided with a pointed end 29.

Between the plates 23, 23' optionally provided with doors 30, 30' to permit access to the spaces 31, 31' (in case these are to be used for stowage purposes) assuming the plates 23, 23' to be circular or polygonal in outline, I may provide a rounded or suitable prismatic body comprising an upper member 33 and a lower member 33',—said upper member preferably including an inner wall 34, an outer wall 35 and a spacing and/or insulating element 36, and said lower member being shown as comprising an inner wall 34', an outer wall 35' and an insulating or spacing element 36'.

To facilitate assembly, some or all of the mentioned walls may initially be distinct, being secured together in any suitable way, as by bolting, riveting or welding; and, to facilitate the loading of my containers and the dropping of any contained articles or substances, without landing, the central compartments 37, defined by the plates 23, 23' and the mentioned inner walls, may be provided not only with a top opening (shown as closed by a curved door at 38) and a bottom opening (shown as closed by a similarly curved door 39,—the door 38 being so formed and positioned as normally to be held closed by the action of gravity, whereas the door 39 is so formed and positioned as to be swung open, when released, by the action of gravity) but also with means such as a so-called skid plate 40, extending diagonally, at a steep pitch, along a lower portion of one side of the compartment 37,—to prevent unintended lodgement of any articles or substances and a consequent failure to deliver the same upon the opening of a door 39, or its equivalent.

The top opening 38, or its equivalent, may be provided with any desired retaining means,—such as a mere latch or turn button 41; but, in order to control, from a remote point, such as a cock pit 42, the movements of the lower door 39, or its equivalent, I may provide said door with a latch organization 43 of a special type,—such as, for example, a latch including a bar or arm 44 with which a rod, wire or cord 45, extending toward said cock pit or other point of remote control may be so connected as to disengage a catch element 46, mounted on said container (as by means of a bracket 47) from a co-operating catch element 48, secured to said door,—a pull upon the wire 45 being, in the illustrated embodiment of my invention, effective to release the door 39 so that any articles or substances resting thereon are free to drop to the ground upon the swinging of the door into a position such as that in which it is shown in dotted lines, in Fig. 4.

The weight of the contents of the compartment 37 being thus automatically removed from the door 39, said door may be closed by any suitable means, as by means of a movable or fixed vane or inclined wing 49 secured at or movable to a suitable angle thereto, and/or by means such as a cord or cords 50, secured to said door or to an arm or arms 51 thereon and extending toward the cock pit 42 or other point of remote control. In the form shown, the element 46 is shown as carried over pulleys 52 (the number and position of these pulleys depending upon what changes in direction may be required) and the cords 50 are shown as passing over similar pulleys 53 (on posts 54) and 55 and as looped over equalizing pulleys 56 (see Fig. 2),—these latter pulleys being carried by cords 50', which may pass, as through openings or eyes 57, into the cock pit 42, or its equivalent; but it will be obvious that, in case I employ either the control elements 45 or the control elements 50, or any similar control elements, such control elements must be kept out of the way of the articles or substances dropped by the opening of the door 39,—as by mounting said door upon a horizontal pivot 58, attaching the latch 43 at the opposite side of said door and securing the posts 51, or their equivalents, to flanges 59, projecting beyond the ends of the door 39 proper.

The general mode of use of my described organization having been indicated in connection with the description thereof, I may point out that one of the mentioned doors, as the door 38, may be dispensed with,—loading and unloading being both effected, although less conveniently, through the door 39, or its equivalent; that spaces within the rounded and/or pointed ends 25 and 25' may be used for the stowage of articles or equipment not necessarily intended to be dropped during flight; and that, assuming containers of the described character to have been loaded before a flight begins, a simultaneous pulling upon the control element 45 and releasing of the door element 50 (assuming both of these control elements to be provided in the same installation) may be relied upon to effect a dropping of the contents of the compartment 37, or its equivalent,—said contents optionally comprising a parachute (not shown) so attached to articles (not shown) as to assure the slow descent thereof, and the door 39 being subsequently closed either automatically (as by means of the wing or vane 49) or manually (as by a pull upon the cord 50' or its equivalent).

In conclusion, I emphasize that my described containers are not only fire-proof, fool-proof, and substantially wreck-proof, but light, rugged, favorably formed, favorably disposed with reference to center of gravity, center of pressure, slip stream and ground wheels, easily controlled, reliable in action, and suitable for use upon all types of aircraft, the carrying of the containers directly upon the wings being favorable to avoidance of the high friction of the slip stream and to the use of a light frame and light fuselage, and favorable to a maximum carrying capacity and/or speed.

Although I have herein described a single complete embodiment of my invention, it should be understood not only that various features thereof may be independently used but also that numerous modifications might be made, by those skilled in the art to which this case relates, without the slightest departure from the spirit and scope of this invention, as the same is indicated above and in the following claims.

I claim as my invention:

1. In means for the transport and delivery of articles by aircraft comprising wing frame elements extending from a central body provided with a forward propeller producing a slip-stream: a built-in container provided with a compartment which extends through said wing frame and having a rounded body and stream-lined ends, said container being so supported by one of said wing frame elements, and just outside of said slip-stream, that it extends partly above and partly below said wing frame element.

2. In means for the transport and delivery of articles by aircraft: a built-in cargo container adapted to be carried by an airplane wing, and having a rounded body and stream-lined ends, transverse plates having doors therein being disposed between said body and said ends, to form separate compartments,—a central compartment being provided with top and bottom openings and end compartments being accessible only from said central compartment.

3. In means for the transport and delivery of articles by aircraft: a built-in cargo container adapted to be carried by an airplane wing, and having a rounded body and stream-lined ends, transverse plates being employed to divide said container into a central compartment and end compartments and to secure the same to frame members, said plates being provided with openings to render said end compartments accessible from said central compartment.

4. In means for the transport and delivery of articles by aircraft: a built-in cargo container adapted to be carried by an airplane wing, and having a rounded body and stream-lined ends, a compartment within said container being provided with both a top opening and a bottom opening and with a closure in said bottom opening.

5. In means for the transport and delivery of articles by aircraft: a built-in container adapted to be carried by an airplane wing, and having a rounded body and stream-lined ends, a compartment within said container being provided with both a top opening and a bottom opening and with a closure in said bottom opening and remotely controllable means for positioning said closure.

6. In means for the transport and delivery of articles by aircraft: a built-in container adapted to be carried by an airplane wing, and having a rounded body and stream-lined ends, a compartment within said container being provided with a bottom opening having a closure and an internal skid plate, extending longitudinally of said compartment and being inclined from one edge of said opening to an adjacent inner face of said container.

7. In means for the transport and delivery of articles by aircraft: a built-in subdivided cargo container having a rounded body and stream-lined ends, a compartment of said container being armored and provided with openings in the top and the bottom thereof, with closures for said openings, and with means for remote control of the bottom closure.

8. In means for the transport and delivery of articles by aircraft: a built-in subdivided cargo container adapted to be carried by an airplane wing, and having a rounded body and stream-lined ends, a plurality of partitions therein forming compartments, only a central compartment of said container being insulated and provided with openings in the top and the bottom thereof, with closures for said openings, and with means for remote control of the bottom closure.

9. In means for the transport and delivery of articles by aircraft: a built-in container having a rounded body and stream-lined ends, a compartment of said container being provided with a downwardly opening door and with means for automatically closing the same during flight.

10. Means for the transport and delivery of articles by aircraft as defined in claim 2, in which said central compartment is provided with a downwardly opening door and with means for manually releasing the same from a remote point, and means for automatically closing said door during flight.

11. In means for the transport and delivery of articles by aircraft: a built-in container having a prismatic body, a compartment of said container being provided with a downwardly opening door and with means for manually closing the same from a remote point.

12. An airplane organization comprising: a fuselage; wing frames; and containers having compartments therein extending through said wing frames, said containers being supported by said wing frames externally of said fuselage, but above and rearwardly of a pair of ground wheels and braced relatively thereto.

13. An airplane organization as defined in claim 1, in which—a stub wing frame element is carried through each container.

14. An airplane organization as defined in claim 1, in which a mentioned frame element is carried through said fuselage and through both of said containers.

15. An airplane organization comprising: a fuselage; wing frames carrying a forward propeller producing a slip-stream; and a plurality of containers, having rounded bodies symmetrically disposed on said wing frames just outside said slip-stream, one of said containers being provided with a bottom opening having a closure which is subject to remote control.

16. An airplane organization comprising: a fuselage; wing frames; a plurality of containers supported therefrom, one of said containers being provided with a bottom opening and with a closure elements whose opening movement is subject to remote control; and means for automatically closing said closure element.

17. In combination with a hinged closure element adapted to swing outwardly from an airplane member in a plane parallel with the line of advance of said airplane: means for automatically imparting a closing movement to said element, comprising an angular extending vane, inclined outwardly and rearwardly relative to the advance of said plane.

In testimony whereof, I have hereunto set my hand at Los Angeles, California, this 28th day of May, 1926.

GEORGE E. BARNHART.